June 13, 1961 L. M. GWYNN 2,988,174
VEHICLE BRAKE
Filed April 17, 1958 2 Sheets-Sheet 1
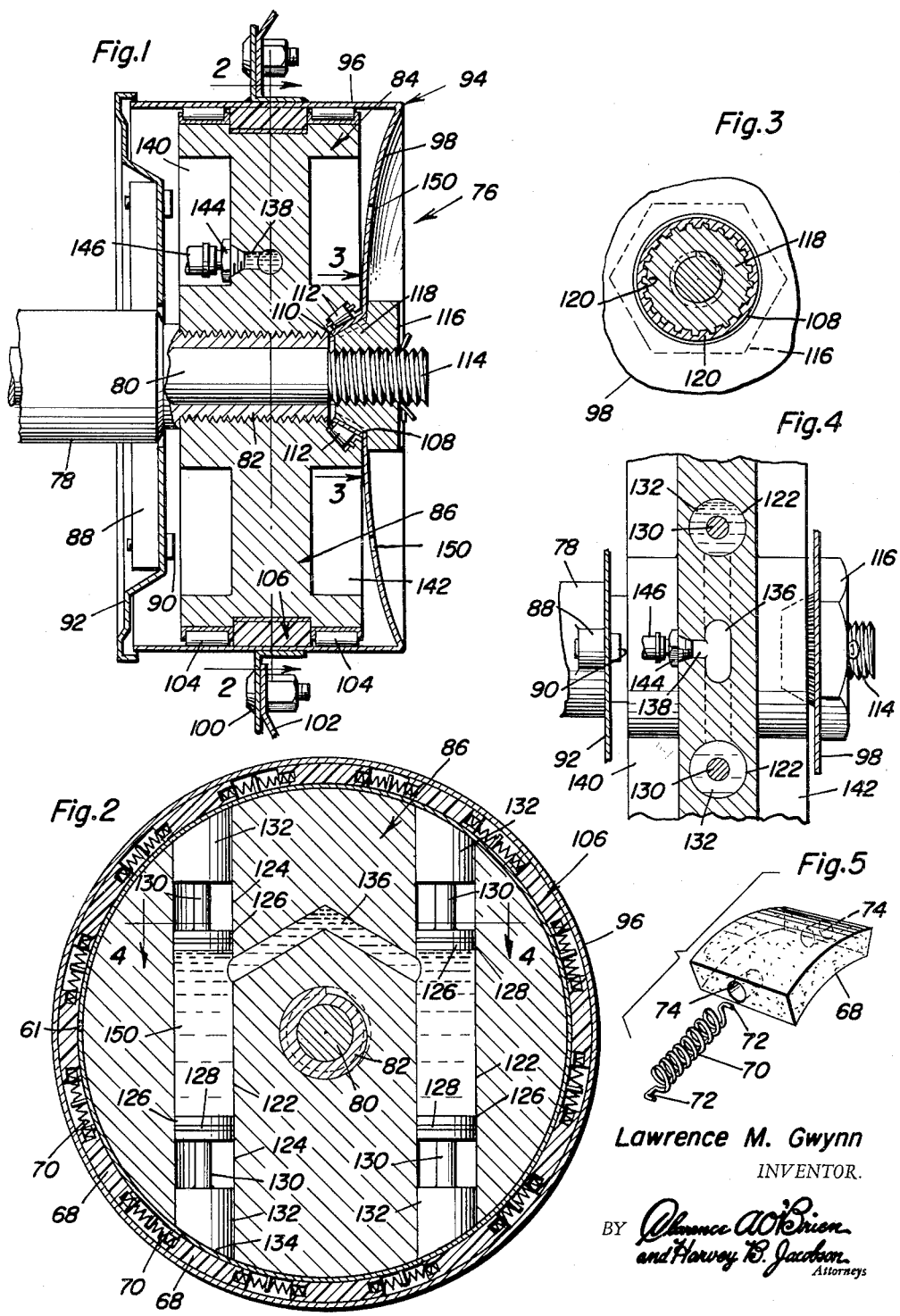
Lawrence M. Gwynn
INVENTOR.

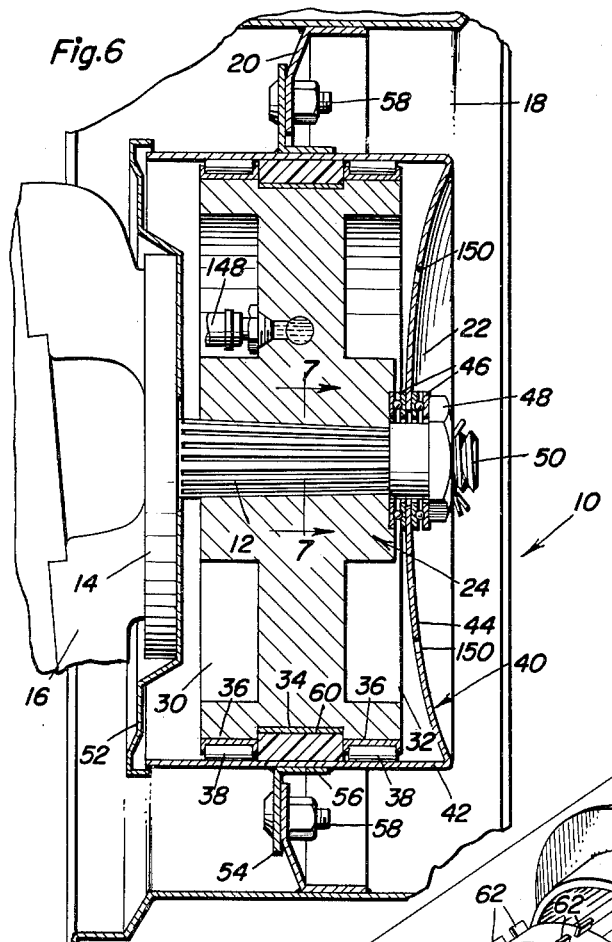
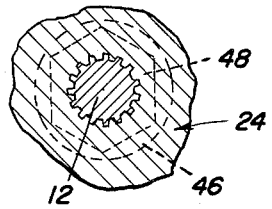
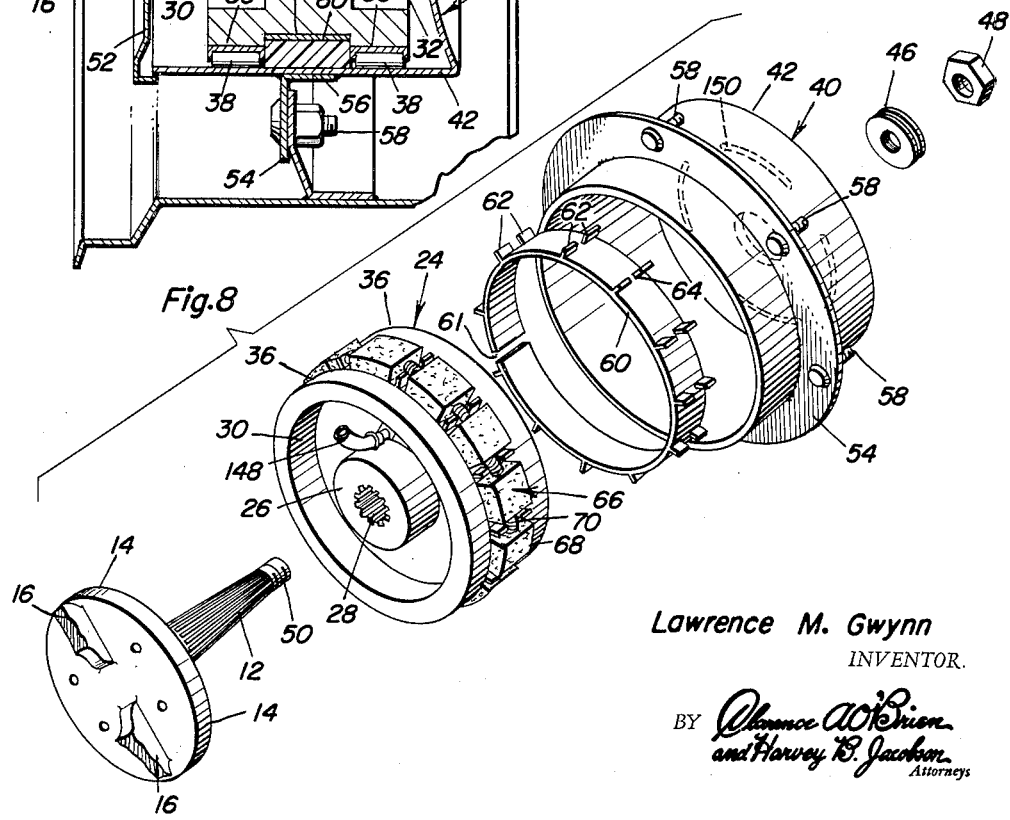
Lawrence M. Gwynn
INVENTOR.

United States Patent Office 2,988,174
Patented June 13, 1961

2,988,174
VEHICLE BRAKE
Lawrence M. Gwynn, 265½ S. High St., Columbus, Ohio
Filed Apr. 17, 1958, Ser. No. 729,092
7 Claims. (Cl. 188—18)

This invention relates in general to new and useful improvements in brakes, and more specifically to an improved vehicle wheel brake.

The present trend in automotive construction is to provide the individual passenger vehicle with smaller diameter tires. This, of course, necessitates small diameter wheels. In order to prevent excessive bending moment, it is desirable that the brake drums fit within the general plane of the vehicle wheel. For that reason, the diameter of the brake drums have become restricted. On the other hand, the vehicle sizes have increased so that a much larger braking power is required.

It is therefore the primary object of this invention to provide an improved vehicle wheel brake which is of such a construction whereby the diameter thereof may be greatly decreased and at the same time a maximum braking power obtained.

Another object of this invention is to provide an improved vehicle wheel brake, the brake being of an extremely compact construction and of a relatively small diameter and at the same time being so constructed whereby a maximum braking power is exerted on the vehicle brake drum so that the vehicle wheel may be reduced in diameter and at the same time the brake can be so constructed whereby it may be mounted within the general plane of the vehicle wheel to produce a maximum braking power without resulting in an undesired bending moment on the vehicle wheel.

Still another object of this invention is to provide an improved vehicle wheel brake which includes a modified form of brake lining construction, the brake lining being in the form of a plurality of individual friction blocks which are connected together by tension spring so as to form a necklace, there being provided small fluid motors including cylinders engaging portions of the necklace so as to expand the necklace and thus force the friction blocks into engagement with a brake drum to provide the necessary braking action.

A further object of this invention is to provide an improved vehicle wheel brake, the wheel brake being of a type which eliminates the necessity for brake shoes and which mounts the lining in a continuous ring, the ring being formed of a plurality of individual friction blocks connected by tension springs and there being provided means for stretching the brake lining to force it outwardly into engagement with and encircling the brake drum to produce the braking effect.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical sectional view taken through a rear wheel assembly incorporating the vehicle brake which is the subject of this invention and shows the general details thereof;

FIGURE 2 is a vertical sectional view taken substantially on the plane indicated by section line 2—2 of FIGURE 1 and shows the specific construction of the vehicle wheel brake;

FIGURE 3 is a fragmentary sectional view taken substantially upon the plane indicated by the section line 3—3 of FIGURE 1 and shows the manner in which the brake drum is drivingly connected to the rear axle of the vehicle;

FIGURE 4 is a fragmentary horizontal sectional view taken substantially upon the plane indicated by the section line 4—4 of FIGURE 2 and shows further the details of the arrangement of pistons and cylinders in the drum of the vehicle to effect the operation of the vehicle wheel brake;

FIGURE 5 is en enlarged fragmentary sectional view showing sections of the brake necklace including the details of one of the friction blocks and one of the tension springs;

FIGURE 6 is a fragmentary vertical sectional view similar to FIGURE 1 and shows the details of a front wheel assembly;

FIGURE 7 is a fragmentary vertical sectional view taken substantially upon the plane indicated by the section line 7—7 of FIGURE 6 and shows the manner in which the drum of the vehicle wheel brake is fixedly mounted on the front wheel spindle; and FIGURE 8 is an exploded perspective view on a reduced scale showing the details of the front wheel brake assembly.

Referring now to the drawings in detail, it will be seen that there is illustrated in FIGURE 6 a front wheel assembly which is referred to in general by the reference numeral 10. The front wheel assembly includes a spindle 12 which is carried by a mounting plate 14 which is in turn secured in place by a hanger assembly 16 of the conventional type. The front wheel assembly 10 also includes a conventional type of front wheel 18 which has a mounting web 20. The front wheel 18 is mounted on the spindle 12 by means of a front wheel brake unit which is referred to in general by the reference numeral 22. The front wheel brake unit 12 includes a hub which is referred to in general by the reference numeral 24. The hub 24 is preferably in the form of a lightweight casting which includes a center 26 having extending therethrough an internally splined bore 28. The spindle 12 is externally splined as is best shown in FIGURE 6 so that the hub 24 is locked on the spindle 12 against rotation.

The hub 24 is provided in opposite sides thereof with annular recesses 30 and 32. Also, the hub 24 is provided with at least one centrally located circumferential recess 34. The circumferential recess 34 has disposed on opposite sides thereof bearing races 36.

Seated on the bearing races 36 are bearing assemblies 38 which in turn support a drum which is referred to in general by the reference numeral 40. The drum 40 includes a cylindrical portion 42 which rides on the bearing assemblies 38. The drum 40 also includes an outer wall 44 in which there is seated a thrust bearing 46. The thrust bearing 46 and the drum 40 are retained in place by means of a nut 48 which is threadedly engaged on a reduced externally threaded portion 50 of the spindle 12. It is to be noted that the cylindrical body portion 42 of the drum 40 terminates at its inner edge adjacent a back plate 52 carried by the mounting plate 14, the backing plate 52 forming a seal with the drum 40 to prevent the entrance of foreign matter into the drum 40.

In order that the wheel 18 may be mounted on the drum 40 for rotation therewith, there is provided an annular mounting flange 54 on the drum 40. The annular mounting flange 54 is part of an L-shaped ring which includes a flange 56 suitably secured to the exterior surface of the drum 40. The web 20 of the wheel 18 is removably bolted to the mounting flange 54 by means of a bolt assembly 58. It is to be noted that the wheel 18 is mounted so that it completely encircles the drum 40 and that the brake unit 22 is disposed within the confines of the wheel 18.

The circumferential recess 34 has seated therein a retaining ring 60 which is split as at 61 and is best illustrated in FIGURE 8. The retaining ring 60 is secured by any convenient means (not shown) to hub 24 and is provided with a plurality of circumferentially spaced pairs of transversely aligned fingers 62. The individual fingers 62 of each pair are spaced apart to provide an opening 64 therebetween.

Also seated in the circumferential recess 34 is a brake necklace which is referred to in general by the reference numeral 66. The brake necklace 66 is formed of a plurality of individual friction blocks 68 which are circumferentially spaced and which are connected together by tension springs 70. The individual friction blocks 68 are segments of an annular ring, as is best shown in FIGURE 5. The tension springs 70 have hooked ends 72 which are interlocked with the individual friction blocks 68. The ends of the tension springs 72 are seated in bores 74 in the circumferential ends of the friction blocks 68.

Referring now to FIGURE 1 in particular, it will be seen that there is illustrated a rear wheel assembly which is referred to in general by the reference numeral 76. The rear wheel assembly 76 includes a rear axle housing 78 in which there is rotatably journalled a rear axle 80. The rear axle housing 78 includes a reduced externally threaded portion 82 on which there is threadedly engaged a hub 84 of a rear brake unit which is referred to in general by the reference numeral 86. The rear axle housing 78 also includes a mounting plate 88 to which there is secured by means of fasteners 90 a backing plate 92.

The brake unit 86 also includes a drum which is referred to in general by the reference numeral 94. The drum 94 includes a cylindrical body portion 96 and an end wall 98. The body portion 96 is provided with a centrally located mounting flange 100 which is identical with the mounting flange 54 and which has secured thereto a web 102 of a rear wheel, the rear wheel being identical to the front wheel 18.

The drum 94 is supported on the hub 86 by means of bearings 104 in the same manner as is the drum 40. Accordingly, further details of the mounting of the drum 94 is believed to be unnecessary. Also, the hub 86 is provided with a brake necklace 106 which is identical with the brake necklace 66.

The end wall 98 of the drum 94 is provided with a frusto-conical inwardly offset portion 108 which is seated in a recess 110 formed in the outer central part of the hub 86. Suitable thrust bearings 112 are carried by the hub 86 and engages the frusto-conical portion 108. Further, the rear axle 80 is provided with an externally threaded portion 114 on which there is threadedly engaged a nut 116. The nut 116 includes a frusto-conical inwardly projecting portion 118 which is externally splined as at 120 and which mates with an internally splined surface 120 on the portion 108, as is best shown in FIGURE 3. Thus, the drum 94 is locked to the rear axle 80 for rotation therewith and to be driven thereby.

Referring now to FIGURES 2 and 4 in particular, it will be seen that the hub 86 is provided with a pair of transversely centrally located spaced parallel bores 122 which define individual cylinders 124 for pistons 126. It will be seen that there are two bores 122 each of which has a pair of cylinders 124 making a total of four cylinders. There are provided four pistons 126, each of the pistons 126 being provided with a sealing ring 128 to form a seal with the wall of the particular cylinder 124.

Secured to each of the pistons 126 is an extension 130 to which there is connected a follower 132. The follower 132 has a projecting end portion 134 which conforms to the inner surface of one of the friction blocks 68.

The bores 122 are connected together by fluid passage 136. Communicated with the fluid passage 136 is a further fluid passage 138 which opens into an annular recess 140 formed in the inner part of the hub 86. The recess 140 corresponding to the recess 30. A similar recess 142 is formed in the outer part of the hub 86. Threadedly engaged in an outer part of the bore 138 is a fitting 144 which connects a hydraulic brake line 146 to the hub 86.

The hydraulic brake line 146 will be connected to a conventional type of master brake cylinder (not shown) which will supply hydraulic brake fluid under pressure to the interior of the hub 86 when the brakes of a vehicle of which the brake unit 84 is a part are applied. The pumping of the hydraulic brake fluid into the hub 86 will result in the increase in hydraulic brake fluid 150 within the cylinders 124 and thus urge the pistons 126 apart. This will result in the followers 132 urging the friction block 68 outwardly thus stretching the brake necklace 106 and increasing the size thereof. This, of course, will cause the individual friction blocks 68 of the brake necklace 106 to move into frictional engagement with the drum 94 and cause a braking action.

At this time it is pointed out that the hub 24 is constructed identical to the drum 86 with the exception of minor changes which are necessary for the mounting of the hub 24 on the front wheel spindle 12 as compared to the mounting of the hub 86 for use with the rear wheel assembly. The internal construction of the hub 24 is identical with the internal construction of the hub 86 and there is connected to the hub 24 a brake line 148 which corresponds to the brake line 146.

Although one brake necklace has been illustrated in conjunction with each of the brake units 22 and 84, it is pointed out that the number of brake necklaces may vary depending upon the braking power required. Further, although only two bearing assemblies have been illustrated for the purpose of mounting the individual brake drums, in the event the width of the brake drums are increased, there will be provided additional bearing assemblies as is deemed necessary. Inasmuch as the individual wheels are becoming wider as the diameter decreases, it will be seen that there will be sufficient wheel width to provide the necessary braking action and at the same time the entire brake unit will be encased in the individual wheel.

In order to facilitate the cooling of the brakes, which is very important, the end walls 44 and 98 of the brake drums 40 and 94, respectively, are inwardly bowed to provide a scooping action. Also, the end walls 44 and 98 are provided with slits 150 to facilitate the entrance of air into the drums 40 and 94 to produce the cooling effect. If desired, the drums may also be finned or may be provided with circumferential scoops to further provide a cooling action.

From the foregoing, it will be readily apparent that there has been devised a new type of vehicle wheel brake unit which may be used in conjunction with existing vehicle constructions and which notwithstanding the fact that the diameter of wheels are being decreased will provide the necessary braking action. Further, the construction of the vehicle brake units proposed is as simple as the present-day brake units and therefore the cost of manufacture will not materially differ.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wheel brake comprising a cylindrical hub, means on said hub for mounting said hub on an axle against relative rotation therewith, a cylindrical drum disposed about said hub, a pair of axially spaced load bearing means disposed between the outer periphery of said hub and the inner surface of said drum rotatably mounting said drum on said hub, an expandable brake necklace secured against rotation to the outer periphery of said hub between said bearing means and engageable with a portion of the inner surface of said drum, brake necklace expanding means carried by said hub for expanding the brake necklace into frictional engagement with said drum, the inner surfaces of said drum being of constant diameter immediately adjacent said bearing means and said necklace, said drum including an end wall, bearing means adapted for securement on said axle and engaging the opposite sides of said end wall for restricting axial movement of said drum.

2. The combination of claim 1 including necklace retaining means carried by said hub, said expandable brake necklace being formed of a plurality of spaced friction blocks connected together by tension springs.

3. The combination of claim 2, wherein said necklace retaining means includes a plurality of circumferentially spaced fingers, said fingers being disposed intermediate said friction blocks.

4. The combination of claim 3 wherein said fingers are disposed in transversely aligned and spaced pairs, said tension springs passing between fingers of each pair of fingers.

5. The combination of claim 1 including a radially extending wheel supporting flange adapted to support a wheel rim secured to the outer surface of said drum intermediate the transversely extending planes in which said first mentioned bearing means lie.

6. A wheel brake comprising a cylindrical hub, means on said hub for mounting said hub on an axle against relative rotation therewith, a cylindrical drum disposed about said hub, a pair of axially spaced load bearing means disposed between the outer periphery of said hub and the inner surface of said drum rotatably mounting said drum on said hub, an expandable brake means secured against rotation to the outer periphery of said hub and engageable with a portion of said drum, brake expanding means carried by said hub for expanding said brake means into friction engagement with said drum, the inner surfaces of said drum being of constant diameter immediately adjacent said bearing means and said expandible brake means, said drum including an end wall, bearing means adapted for securement on said axle and engaging opposite sides of said end wall for restricting axial movement of said drum.

7. The combination of claim 6 including a radially extending wheel supporting flange adapted to support a wheel rim secured to the outer surface of said drum and lying in a plane extending transversely of said drum and between said first mentioned bearing means.

References Cited in the file of this patent
UNITED STATES PATENTS

| | | |
|---|---|---|
| 653,692 | Otto et al. | July 17, 1900 |
| 659,115 | Whitcomb et al. | Oct. 2, 1900 |
| 1,297,165 | Higbee | Mar. 11, 1919 |
| 1,352,060 | Gibson | Sept. 7, 1920 |
| 1,707,272 | Livingston | Apr. 2, 1929 |
| 1,918,572 | Snyder et al. | July 18, 1933 |
| 1,968,810 | Dixon | Aug. 7, 1934 |
| 1,983,751 | Goodyear et al. | Dec. 11, 1934 |
| 2,008,729 | Sauzedde | July 23, 1935 |
| 2,087,062 | McCauley | July 13, 1937 |
| 2,206,742 | Dodge | July 2, 1940 |
| 2,382,228 | Howell | Aug. 14, 1945 |
| 2,386,116 | Hunter | Oct. 2, 1945 |